(12) United States Patent
Heusmann et al.

(10) Patent No.: US 8,464,955 B2
(45) Date of Patent: Jun. 18, 2013

(54) DATA CARRIER CONFIGURATION

(75) Inventors: Hans Heusmann, Egenhofen (DE); Albert Ojster, Grunwald (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/146,202

(22) PCT Filed: Jan. 26, 2010

(86) PCT No.: PCT/EP2010/050836
§ 371 (c)(1),
(2), (4) Date: Jul. 26, 2011

(87) PCT Pub. No.: WO2010/086293
PCT Pub. Date: Aug. 5, 2010

(65) Prior Publication Data
US 2011/0278361 A1    Nov. 17, 2011

(30) Foreign Application Priority Data
Jan. 27, 2009    (DE) .................... 10 2009 006 341

(51) Int. Cl.
*G06K 19/02*    (2006.01)

(52) U.S. Cl.
USPC ........................... 235/488; 235/492

(58) Field of Classification Search
USPC .......................................................... 235/488
See application file for complete search history.

(56) References Cited

U.S. PATENT DOCUMENTS

| 7,264,172 B2 | 9/2007 | Amiot et al. | |
| 2002/0050527 A1* | 5/2002 | Nishikawa et al. | 235/492 |
| 2009/0200381 A1* | 8/2009 | Schober et al. | 235/486 |

FOREIGN PATENT DOCUMENTS

| DE | 19921525 | 11/2000 |
| EP | 1117063 | 7/2001 |
| FR | 2853434 | 10/2004 |
| WO | 0235467 | 5/2002 |

OTHER PUBLICATIONS

International Search Report in PCT/EP2010/050836, Apr. 28, 2010.

\* cited by examiner

*Primary Examiner* — Kristy A Haupt
(74) *Attorney, Agent, or Firm* — Bacon & Thomas, PLLC

(57) ABSTRACT

A data carrier configuration includes a card-like carrier having a recess and an electronic data carrier in the form of an IC card which is removably mounted in the recess. The data carrier has an arrangement for fastening on an object. Methods for the production of such a configuration include making the carrier rigid and the IC card flexible, so that introduction of the data carrier into the recess and removal of same from the recess are possible via unrolling of the electronic data carrier. The fastening arrangement is in the form of a self-adhesive layer, which is covered by a removable protective layer.

16 Claims, 3 Drawing Sheets

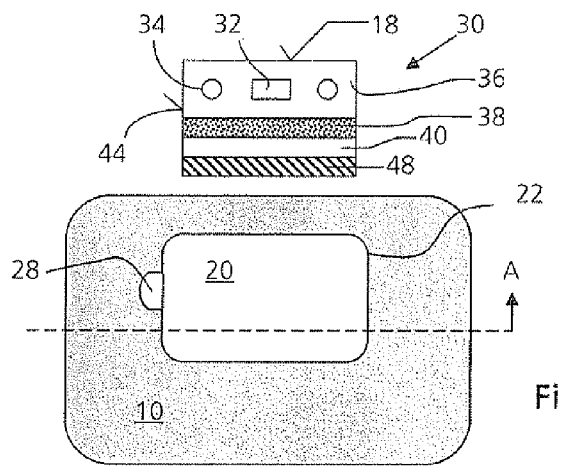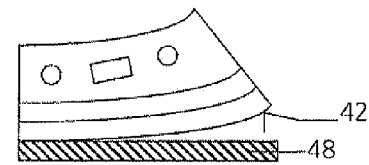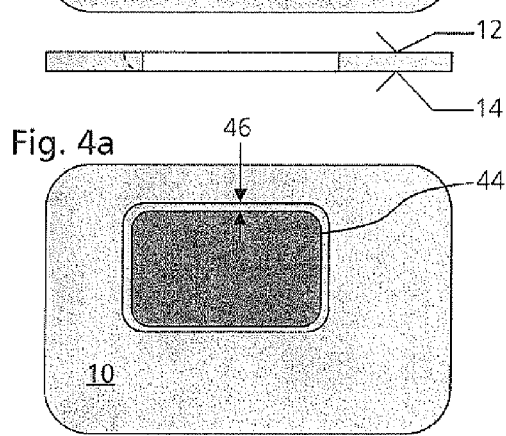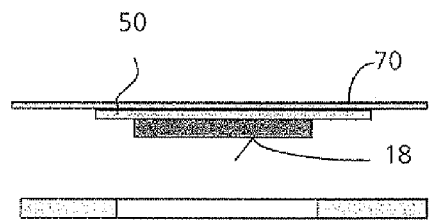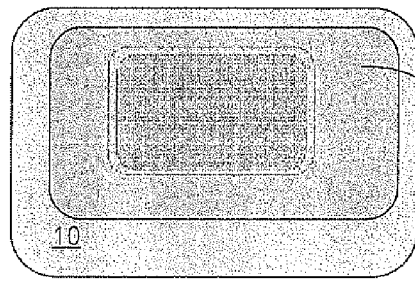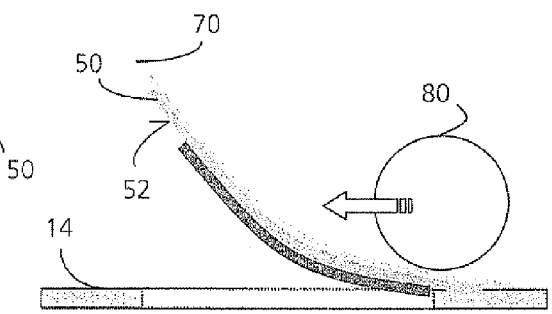
Fig. 1a
Fig. 1b
Fig. 4a
Fig. 2
Fig. 4b
Fig. 3

# US 8,464,955 B2

DATA CARRIER CONFIGURATION

BACKGROUND OF THE INVENTION

1. Field of the Invention

The invention is directed to a data carrier configuration, as is known from EP 1117063 A1.

2. Related Art

A data carrier configuration comprising an IC card having a recess and a SIM card placed in the recess may be inferred therefrom, the recess being generated in that an opening is introduced into the IC card and this opening is subsequently underlaid with a layer which adheres to the opening interior. The adhesive layer holds the SIM card in the recess. The solution has the effect that bending and torsion forces are not transmitted from the IC carrier card onto the SIM card and thus make the separation of the SIM card from the IC carrier card easier. However, the application of the carrier film onto the rear side and the insertion of the SIM card in the recess thus provided form complex method steps which increase the costs.

The object of the invention is to disclose a data carrier configuration, which provides a smaller electronic data carrier cost-effectively on a carrier, the entire data carrier configuration being able to be handled like a data carrier in the format of the carrier.

SUMMARY OF THE DISCLOSURE

The solution according to the invention is based on the approach of employing a flexible electronic data carrier which, in order to connect it to the carrier, is unrolled in a recess provided in the rigid carrier. It is thus possible to connect an adhesive underlay, which carries the electronic data carrier, and the electronic data carrier itself to the carrier in one work step. The resulting data carrier configuration according to the invention according to the main claim has the advantage that it may be processed, for example, personalized, in a machine which is designed for the processing of data carriers in the format of the carrier. The data carrier configuration may be produced cost-effectively, because only one opening is introduced into the carrier and the requirements for the precision thereof are not excessively high. The electronic data carriers may advantageously be provided on a roll, whereby the handling thereof and the connection to carriers may be simplified. The same carriers may also advantageously be used, at least to a certain extent, for electronic data carriers having different external dimensions. The data carrier configuration may also advantageously be relayed to end users without further processing. The same advantages are offered by the variant, where a recess is introduced into the carrier instead of an opening in a known way. The second embodiment particularly supports the processing of the data carrier configuration in a machine set up for data carriers in the format of the carrier, in that they close the gap between electronic data carrier and carrier completely airtight, but nonetheless offer the possibility of processing the surface of the electronic data carrier directly, in order to visually personalize it, for example.

Exemplary embodiments of the invention are explained in greater detail hereafter with reference to the drawing.

BRIEF DESCRIPTION OF THE DRAWINGS

In the figures:

FIGS. 1a and 1b show the components of a data carrier configuration according to a first exemplary embodiment in cross-section and partially in a top view, FIG. 2 shows the provision of an electronic data carrier on a transport film above a carrier in cross-section, FIG. 3 shows the unrolling of a transport film having electronic data carriers located thereon, in order to connect it to the carrier, FIGS. 4a and 4b show a data carrier configuration after the introduction of the electronic data carrier into the carrier in top views from the top side and from the bottom side.

DETAILED DESCRIPTION OF PREFERRED EMBODIMENTS OF THE INVENTION

Figure 5:
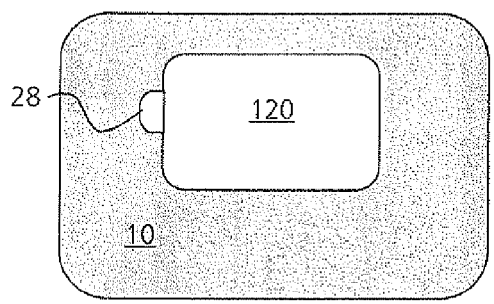
FIG. 5 shows an embodiment of a carrier according to a second exemplary embodiment.

FIG. 1 shows a carrier 10 according to the invention, in a top view and underneath in a cross-section along line A, in which an opening 20 is introduced by punching, cutting, or milling. As in all further figures, the dimensions and proportions shown were only selected for purposes of better illustration and are not to be understood as concrete specifications. The carrier 10 is designed as a flat body having a top side 12 and a bottom side 14 and comprises a rigid material, which only allows slight bends at bending angles of not greater than 45°. In the underlying exemplary embodiment hereafter, the carrier 10 is formed by a card body in the ISO format, as is used for producing chip cards. It has the external dimensions and thickness thereof. The carrier 10 is therefore referred to hereafter as the transport card. The opening 20 is designed so that a flat electronic data carrier 30 fits therein in its entirety, as is shown above the top view of the transport card 10 in cross-section; the size ratios shown are to be understood as not to scale. The external contour 44 of the electronic data carrier 30 expediently has, as indicated in FIG. 4, the same shape as the internal contour 22 of the opening 20. For example, the electronic data carrier 30 may have external dimensions which approximately correspond to an SIM card; without further measures, however, it may also have a marginal contour 44 having an entirely different geometry, which may also deviate from the internal contour 22 of the opening 20. Thus, for example, an electronic data carrier 30 having rounded corners may be placed in an opening 20 having the shape of a rectangle.

The electronic data carrier 30 carries an integrated circuit 32 and an interface 32, which is connected thereto, for communication with a read unit, which may be implemented as contactless in particular, as indicated in FIG. 1, and has the form of an antenna; however, other embodiments of the interface 32 also readily come into consideration, such as a contact-operated interface in the form of a contact panel situated toward the visible surface 18 of the electronic data carrier 30. As illustrated in FIG. 1b, the electronic data carrier 30, in contrast to the transport card 10, is manufactured from a flexible material which has a lower modulus of elasticity than the material used for the transport card 10. The electronic data carrier 30 therefore allows significant bending at bending angles of 90° or more and may be situated readily even in a terminal position on a curved substrate. The height of the electronic data carrier 30 is adapted to the thickness of the transport card 10 or the recess 20 provided in the transport card 10 in such a way that an ensemble comprising transport card 10 and inserted data carrier 30 can be handled and processed in machines which are actually configured for processing data carriers having the dimensions of a transport card 10. The height of the electronic data carrier 30 expediently corresponds to the thickness of the transport card 10 precisely or up to a slight permissible deviation. However, a slight protrusion or a slight depression in relation to the surface of the transport card 10 is frequently possible. The electronic data carrier 30 may be a contactless communicating IC card implemented as a sticker or label, for example, which is attached to a mobile telephone in order to allow an NFC transaction.

The electronic data carrier 30 has multiple layers. The integrated circuit 32, the antenna 34, and optionally provided further components are situated in a first layer 36. A ferrite layer 38 lies below the layer 36, viewed from the visible surface 18, and underneath that a self-adhesive layer 40 which sticks to the bottom side 42. The self-adhesive layer 40 is covered by a protective layer 48, which is removable from the self-adhesive layer 40. The protective layer 48 may in turn be implemented as adhesive on its bottom side in one embodiment variant. The layer sequence shown is not binding; further layers may be provided, if this is necessary for technical reasons. On the other hand, the protective layer 40 and above all the ferrite layer 38 may also be dispensed with, or implemented as a property of another layer. The layer 36 can be implemented integrally or can comprise multiple partial layers.

The external contour 44 of the electronic data carrier 30 expediently corresponds to the internal contour 22 of the opening 20 in the transport card 10, but is preferably completely enclosed thereby while leaving a tolerance distance, so that a residual gap 46 remains peripherally on all sides in the inserted state between the outer edge 44 of the electronic data carrier 30 and the inner edge 22 of the opening in the transport card 10. The permissibility of the residual gap 46 makes placing the electronic data carrier 30 in the opening 20 easier and additionally allows electronic data carriers 30 having different external contours 44 to be placed in the same type of transport card 10. A grip indentation 28 in the form of a spherical surface segment, for example, is implemented at a suitable point on the periphery of the internal contour 22 of the opening 20, which supports engaging a finger below an electronic data carrier 30 mounted in the opening 20.

FIG. 2 shows a section through a transport card 10 as shown in FIG. 1 in a cross-section along line A, and above it a transport film 70, on which an underlay 50 is placed so it is removable and on which an electronic data carrier 30 is in turn placed so it is removable. The underlay 50 is preferably a film whose thickness is so low that the processing of a transport card 10 which is applied on one side of a substrate 50, in a processing machine, such as a personalization station, is not impaired. The underlay 50 is at least partially, preferably completely larger than the passage of the opening 20, so that the underlay completely covers the opening 20 in the connected state. On the side 52 facing toward the transport card 10, the underlay 50 is provided with an adhesive layer, to which the electronic data carrier 30 adheres. In the configuration shown in FIG. 2, the electronic data carrier 30 is seated on the underlay 50 or on the transport film 70 so that its visible surface 18 points downward, i.e., toward the base of the recess 20. It is placed on the underlay 50 so that upon connection of the configuration, which comprises transport film 70 and the electronic data carrier 30, to the transport card 10, the electronic data carrier 30 comes to rest in the opening 20 and the underlay 50 completely covers the passage of the opening 20.

The transport film 70 having the underlay 50 and the electronic data carrier 30 located thereon may be provided individually for each transport card 10. However, the transport film 70 is preferably a strip provided on a roll, on which a plurality of electronic data carriers 30 is situated in one or more parallel rows.

For the introduction of the electronic data carrier 30 into the opening 20 in the transport card 10, the transport film 70 is unrolled above the rear side 14 of the transport card 10. This procedure is illustrated in FIG. 3. The transport film 70 having the underlay 50 and the electronic data carrier 30 located thereon is oriented above the bottom side of the transport card 10 so that, by the unrolling of the employed roll and/or as indicated in FIG. 3, by the movement of a roller 80, the underlay 50 is first pressed on the bottom side of the transport card, then a first inner edge of the electronic data carrier 30 is pressed into the opening 20, then the remaining card body of the electronic data carrier 30 is pressed into the opening 20, and finally the protruding part of the underlay 50 facing away is pressed onto the surface of the transport film 70. Due to the adhesive layer applied to the transport film 70, the transport film 70 adheres in the areas adjacent to the opening 20, in which it rests thereon, on the transport card 10. During or after the application of the underlay 50 having the electronic data carrier 30 onto the transport card 10, the transport film 70 is removed from the underlay 50. The surface 52 of the underlay 50 pointing into the opening forms the base of a recess 20 in the transport card 10 which is provided by the application of the underlay 50 from the opening.

A configuration made of a transport card having a recess 20 into which an electronic data carrier 30 is inserted then results. FIG. 4a shows a top view of the top side 12 of the transport card 10. The electronic data carrier 30 may be recognized from this side, which is seated in the recess 20 while leaving a peripheral gap 46 between the outer edge 44 of the electronic data carrier 44 and the inner edge 22 of the opening 20. FIG. 4b shows a top view of the bottom side 14 of the same transport card 10, in which only the underlay 50 transferred to the transport card 10 may be recognized, which completely covers the opening of the passage 20.

The visible surface 18 of the electronic data carrier 30 is precisely aligned in the inserted state with the top side of the transport card 10, and/or aligns therewith at a precision within the scope of a predetermined tolerance, so that the visible surface 18 of the electronic data carrier and the surface 12 of the transport card 10 form a homogeneous planar surface except for the installation gap 46. The configuration comprising the transport card 10 and the electronic data carrier 30 inserted therein may be supplied for processing in a machine oriented to the format of the transport card 10. It may also be delivered to end users, who separate the electronic data carrier 30 from the transport card 10.

The adhesion of the electronic data carrier 30 on the base of the recess is dimensioned so that the electronic data carrier 30 is readily removable manually from the recess 20. The removal is preferably again performed by an unrolling movement, the flexible electronic data carrier 30 first being raised at on one edge and then being bent out of the plane of the transport card 10. The raising is supported by the grip indentation 28, if provided. Upon removal of the electronic data carrier 30 from the recess 20, the protective layer 48 preferably separates from the base of the recess 20. The adhesion between the self-adhesive layer 40 of the electronic data carrier 30 and the protective layer 48 is expediently greater than the adhesion between the protective layer 48 and the base 52 of the recess 20. In a following step after the separation from the transport card 10, a user may then remove the protective layer 48 from the self-adhesive layer 40 of the electronic data carrier 30. The electronic data carrier 30 may subsequently be fastened to an object by sticking on. In a variant, the adhesion between the self-adhesive layer 40 of the electronic data carrier 30 and the protective layer 48 may also be less than the adhesion between the protective layer 48 and the base 52 of the recess 20, so that the protective layer 48 remains in the recess upon removal of the electronic data carrier 30 and exposes the self-adhesive layer 40. The electronic data carrier 30 may then be fastened directly to an object.

In a variant of the previously described first exemplary embodiment, the recess 20 in the transport card 10 is not achieved by applying an opening 20 and subsequently closing it using an underlay 50, but rather is applied as an integral component of the transport card 10. The variant is illustrated in FIG. 5. The application of the recess 120 may be performed, for example, in that firstly a card body is provided and the recess 120 is milled out therein, or in that a card body having a recess 120 is injection molded using a mold, for example. The recess 120 can also be produced by prior bonding, e.g., lamination, of two partial layers, one of which has a passage and the other of which is implemented as continuous. Furthermore, it is possible to previously bond two continuous partial layers with a separating layer interposed in the area of the later recess and subsequently to stamp or cut out the area of the partial layer over the separating layer. The depth of the recess 120 and/or the thickness of an electronic data carrier inserted therein are dimensioned so that the visible surface 18 of an electronic data carrier 10 inserted into the recess and the top side 12 of the transport card 10 align exactly and/or align with one another in the scope of a predetermined precision.

Figure 6:
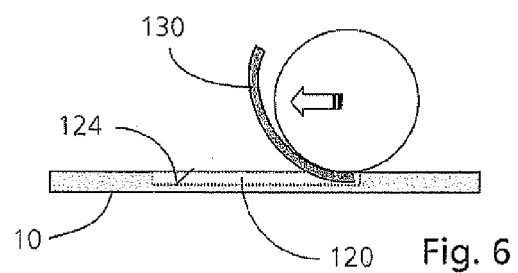
FIG. 6 shows the unrolling of an electronic data carrier for introduction into a carrier.

The electronic data carrier 30 is, as shown in FIG. 6, again expediently provided on a roll 80 or introduced into the recess 120 with the aid of a roller. The electronic data carrier 30 is fundamentally unrolled into the recess 120 in the same way as described in the first exemplary embodiment, so that it detaches from the employed roll 80 and/or transport underlay. In contrast to the first exemplary embodiment, an underlay 50 is not used. In a variant, it is provided that the base 124 of the recess 120 is provided with a lightly adhering adhesive layer, so that the electronic data carrier 30 adheres thereon. Alternatively thereto, the protective layer 40 of the electronic data carrier 30 may be provided with an adhesive layer toward the base of the recess 120, so that the electronic data carrier 30 adheres in the recess 120. An adhesive layer is optional in any case, however.

Figure 7:
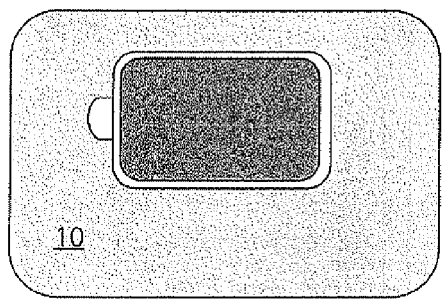
FIG. 7 shows a data carrier configuration according to the second exemplary embodiment after introduction of the electronic data carrier into the carrier in a top view.

FIG. 7 shows the data carrier configuration resulting after introduction of the electronic data carrier 30 into the recess 120 in a top view of the top side or the visible surface 18 of the electronic data carrier 30. The electronic data carrier 30 is again seated in the recess 120 while leaving a peripheral marginal gap 46, the visible surface 18 of the electronic data carrier and the top side 12 of the transport card 10 aligning with one another.

Figure 8:
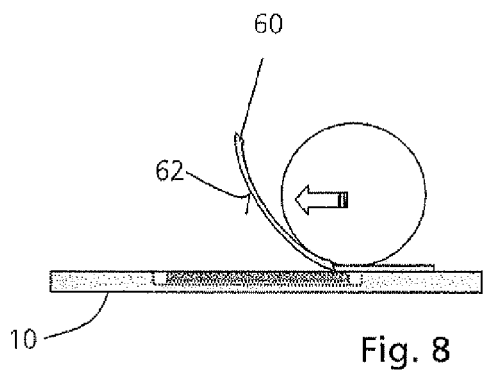
FIG. 8 shows the application of a cover onto the top side of a data carrier configuration.

A cover 60 is subsequently applied on the configuration thus provided, as illustrated in FIG. 8. The cover 60 is expediently provided in the form of a film on a roll and unrolled therefrom over the data carrier configuration. The cover 60 is self-adhesive. For this purpose, it is provided toward the top side 12 of the transport card 10 and/or toward the visible surface 18 of the electronic data carrier 30 with an adhesive layer, whose adhesive force is dimensioned so that the cover 60 may readily be pulled off again later by a user. The cover 60 is larger than the passage of the recess 120 and fixes the electronic data carrier 30 in the recess 120.

Figure 9:
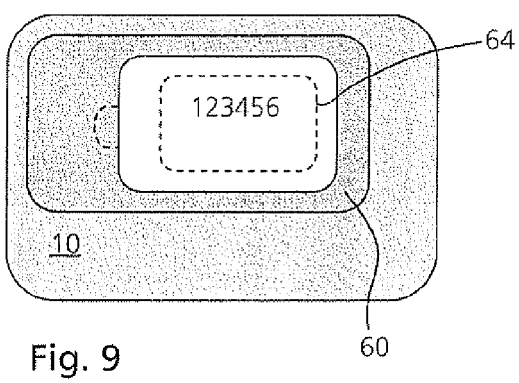
FIG. 9 shows a data carrier configuration according to the second exemplary embodiment after application of the cover in a top view.

As shown in FIG. 9, the cover 60 is expediently designed so that it covers the marginal area of the electronic data carrier 30, the gap 46, and an area on the top side 12 of the transport card 10, which encloses the recess passage, but the inner area of the surface of the electronic data carrier remains exposed. The surface 18 of the electronic data carrier 30 may be reached and processed directly through the exposed window 64. For example, alphanumeric characters may be applied to the visible surface 18 through the window 64 in a personalization facility by printing or lasers. The application of the cover 60 may also be performed together with the introduction of the data carrier 30 into the recess 120 in one work step, of course. Cover 60 and electronic data carrier 30 only have to be provided jointly for this purpose on a correspondingly prepared roll.

The data carrier configuration shown in FIG. 9, like the data carrier configuration according to the first exemplary embodiment, may be supplied for processing in a machine oriented to the format of the transport card 10 and may also be transferred to an end user without further alteration. In order to be able to use the electronic data carrier 30, the end user removes the cover 60 from the transport card 10 and subsequently separates the electronic data carrier 30 from the cover 60. The adhesion between the protective layer 48 and the cover 60 is dimensioned as less than the adhesion between the protective layer 48 and the self-adhesive layer 40 of the electronic data carrier 30. In a finishing step, the end user removes the protective layer 48 from the self-adhesive layer 40 on the electronic data carrier 30, which may then be fastened to an object. In a variant, the adhesion between protective layer 48 and cover 60 may be dimensioned as greater than the adhesion between the protective layer 48 and the self-adhesive layer, so that after the separation of the electronic data carrier 30 from the cover 60, the self-adhesive layer 40 is exposed and the electronic data carrier 30 may be fastened directly to an object.

Figure 10:
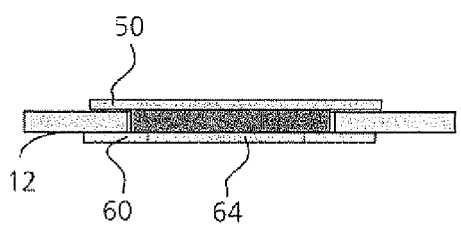
FIG. 10 shows a data carrier configuration obtained by combination of the two exemplary embodiments.

The two exemplary embodiments may also be partially combined. Thus, as shown in FIG. 10, a cover 60 may also be used for a data carrier configuration as shown in FIG. 4. The cover 60 is applied to the front side 12 of the transport card 10, preferably again by rolls, so that the residual gap 46 between electronic data carrier 30 and opening 20 is completely closed. Direct processing of the visible surface 18 of the electronic data carrier 30 may again be performed through the window 64, in order to visually personalize it, for example. The adhesion between cover 60 and visible surface 18 may alternately be set according to the wishes of the producer of the data carrier configuration in this embodiment, so that the electronic data carrier adheres either to the underlay 50 or to the cover 60 upon removal from the transport card 10.

Figure 11A:
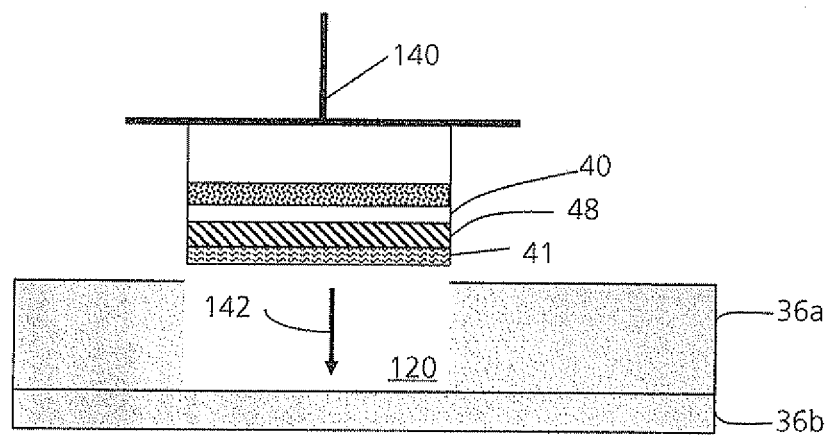
FIGS. 11a and 11b show a variant of the insertion of an electronic data carrier into a carrier.
Figure 11B:
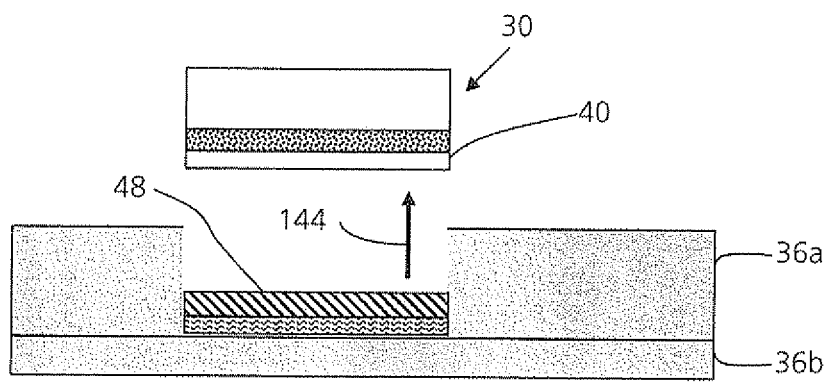

As an alternative to the provision on a roller and unrolling in a recess 20, 120, the electronic data carrier 30 can also be inserted using a manipulator 140 in a linear movement into the recess 20, 120 in the transport card 10, as illustrated in FIG. 11a. In a simple embodiment, the insertion is performed vertically from above, as indicated by the arrow 142. However, other movement sequences are readily possible. For example, the electronic data carrier 30 can first be placed on one edge and subsequently tilted over the edge. The tilting can also merge into unrolling. The recess 120 is preferably of the previously applied type as shown in FIG. 5. The electronic data carrier 30 expediently has a two-layered structure having two partial layers 36a, 36b, as indicated in FIGS. 11a and 11b, one very thin partial layer 36b being continuous and the other partial layer 36a, which is very thick in comparison, containing a passage, so that the two form the recess 120 in the assembled state. The thickness of the electronic data carrier 30 is typically somewhat greater than the depth of the recess 120, so that the electronic data carrier 30 protrudes slightly beyond the surface of the transport card 10 and thus indicates its separability. Moreover, the electronic data carrier 30 expediently has a layer structure as illustrated in FIG. 1a, a second self-adhesive layer 41 additionally being provided under the protective layer 48. The second self-adhesive layer 41 adheres more strongly than the first self-adhesive layer 40. The adhesion between the protective layer 48 and the base 124 of the recess 120 is thus stronger than the adhesion between the protective layer 48 and the first self-adhesive layer 40. When the data carrier 30 is detached from the recess 120, as indicated in FIG. 11b by the arrow 144, the protective layer 48 therefore remains in the recess 120 and the electronic data carrier 30 can be fastened directly on an object using the exposed self-adhesive layer 40.

The invention claimed is:

1. A data carrier configuration comprising:
   a rigid, flat carrier having a recess which is open toward the top side of the carrier,
   an electronic data carrier which is removably mounted in the recess and is flat, said electronic data carrier having an integrated circuit and means for fastening on an object,
   wherein the electronic data carrier is flexible so that the electronic data carrier is configured to be removable from the recess by being unrolled, and
   the means for fastening of the electronic data carrier comprises a self-adhesive layer.

2. The configuration according to claim 1, wherein a visible surface of the electronic data carrier is aligned with a surface of the carrier encompassing an opening of the recess with a precision within a predefined tolerance, or only slightly protrudes or sinks below the surface, so that an ensemble comprising the flat carrier and electronic data carrier is configured to be handled and processed in machines which are configured for processing electronic data carriers having the dimensions of a carrier.

3. The configuration according to claim 1, wherein the electronic data carrier is fastened on a base of the recess using the self-adhesive layer.

4. The configuration according to claim 1, wherein the self-adhesive layer is covered by a removable protective layer, a base of the recess is adhesive, and the electronic data carrier having the protective layer is fastened thereon.

5. The configuration according to claim 4, wherein the adhesion between the protective layer and the base of the recess or the adhesion between the protective layer and the second self-adhesive layer is less than the adhesion between the protective layer and the self-adhesive layer.

6. The configuration according to claim 4, wherein the adhesion between the protective layer and the base of the recess or the adhesion between the second self-adhesive layer and the base of the recess is greater than the adhesion between the protective layer and the self-adhesive layer.

7. The configuration according to claim 1, wherein the self-adhesive layer is covered by a removable protective layer and said protective layer is covered by a second self-adhesive layer.

8. The configuration according to claim 1, wherein in that a cover is applied over the recess and the visible top side of the electronic data carrier, which is larger than the opening of the recess and leaves a part of the visible surface of the electronic data carrier exposed.

9. The configuration according to claim 1, wherein a grip indentation is provided on the margin of the recess.

10. A method for producing a data carrier configuration including a rigid, flat carrier having a recess and an electronic data carrier, which is removably mounted in the recess and is also flat, and which has an IC and means for fastening to an object, comprising the steps:
    providing a carrier;
    providing an opening to the recess in the carrier;
    providing a flexibly implemented electronic data carrier on a flexible underlay, which is larger than the opening and which adheres on a side carrying the electronic data carrier,
    unrolling the underlay over the opening in such a way that the electronic data carrier comes to rest therein and the underlay adheres fixedly on the carrier, and forms a base of the recess.

11. The method according to claim 10, wherein after introduction of the electronic data carrier into the recess a self-adhesive cover is applied over it.

12. The method according to claim 10, wherein the depth of the recess is configured so that the visible surface of the electronic data carrier aligns with a surface of the carrier which encompasses the recess with a precision lying within a predefined tolerance, or only slightly protrudes or falls below the surface, so that an ensemble comprising carrier and data carrier is configured to be handled and processed in machines which are actually configured for processing data carriers having the dimensions of a carrier.

13. A method for producing a data carrier configuration including a rigid, flat carrier having a recess and an electronic data carrier which is removably mounted in the recess and is also flat, and which has an integrated circuit and means for fastening on an object, comprising the steps:
    providing a carrier;
    providing a recess having a base and an opening thereto in the carrier;
    providing a flexible manufactured electronic data carrier which has a self-adhesive layer on a bottom side thereof, facing away from visible surface of the electronic data carrier,
    inserting the electronic data carrier into the recess in such a way that the bottom side comes to rest having the self-adhesive layer on the base of the recess and a visible surface points toward the opening of the recess, wherein the insertion of the electronic data carrier is performed by unrolling over the recess.

14. The method according to claim 13, wherein an adhesive layer is provided on the base of the recess.

15. A method for producing a data carrier configuration including a rigid, flat carrier having a recess and an electronic data carrier which is removably mounted in the recess and is also flat, and which has an integrated circuit and means for fastening on an object, comprising the steps:
    providing a carrier;
    providing a recess having a base and an opening thereto in the carrier;

providing a flexible manufactured electronic data carrier which has a self-adhesive layer on a bottom side thereof, facing away from visible surface of the electronic data carrier, inserting the electronic data carrier into the recess in such a way that the bottom side comes to rest having the self-adhesive layer on the base of the recess and a visible surface points toward the opening of the recess, wherein a first self-adhesive layer is applied to the bottom side of the electronic data carrier, a protective layer is applied thereon, and a second self-adhesive layer is applied thereon.

16. The method according to claim 15, wherein the adhesion of the second self-adhesive layer is greater than the adhesion of the first self-adhesive layer.

* * * * *